(12) United States Patent
Xu et al.

(10) Patent No.: US 8,832,036 B2
(45) Date of Patent: Sep. 9, 2014

(54) PERFORMANCE OF CONCURRENT DATA INSERTING

(75) Inventors: Xi Ming Xu, Beijing (CN); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 13/154,628

(22) Filed: Jun. 7, 2011

(65) Prior Publication Data

US 2012/0054159 A1 Mar. 1, 2012

(30) Foreign Application Priority Data

Aug. 31, 2010 (CN) .......................... 2010 1 0271095

(51) Int. Cl.
*G06F 17/30* (2006.01)

(52) U.S. Cl.
CPC ..................... *G06F 17/30* (2013.01)
USPC ........... 707/673; 707/665; 707/778; 707/696; 707/715; 707/741

(58) Field of Classification Search
CPC ............ G06F 17/276; G06F 17/30321; G06F 17/30348; G06F 17/30625; G06F 17/30938; G06F 17/50; G06F 2217/74
USPC .................. 707/673, 665, 778, 696, 715, 741
See application file for complete search history.

(56) References Cited

U.S. PATENT DOCUMENTS

| | | | |
|---|---|---|---|
| 6,334,134 B1 | 12/2001 | Haderle et al. | |
| 6,895,487 B2 | 5/2005 | Thusoo et al. | |
| 7,228,309 B1 * | 6/2007 | Fisher | .................................. 1/1 |
| 7,412,465 B2 | 8/2008 | Hop Hing et al. | |
| 7,505,979 B2 | 3/2009 | Tamatsu | |
| 8,176,021 B2 * | 5/2012 | Kodavalla et al. | ............ 707/696 |
| 2005/0021745 A1 | 1/2005 | Bookman et al. | |

(Continued)

FOREIGN PATENT DOCUMENTS

| | | |
|---|---|---|
| CN | 1037044 A | 11/1989 |
| CN | 1937574 A | 3/2007 |
| CN | 101359333 A | 2/2009 |

OTHER PUBLICATIONS

Index Optimization Tips (7 pages).

(Continued)

*Primary Examiner* — Yicun Wu
(74) *Attorney, Agent, or Firm* — Mohammed Kashef; Edell, Shapiro & Finnan, LLC

(57) ABSTRACT

A method, system and computer program product for improving performance of concurrent data inserting provide the features of adding a prefix to each key value in an index, wherein the prefix has a default value, allocating a corresponding prefix to each concurrent inserting process in response to an occurrence of a hot spot mode being detected, wherein each allocated prefix is different from the default value, performing an inserting operation in the hot spot mode, wherein the inserting operation includes deciding whether a key value can be inserted with the default value of the prefix, in response to a determination that an insertion of a key value with the default value of the prefix can be performed, inserting the key value with the default value of the prefix, and in response to a determination that an insertion of a key value with the default value of the prefix cannot be performed, inserting the key value with another prefix allocated by the inserting process.

20 Claims, 3 Drawing Sheets

(56) References Cited

U.S. PATENT DOCUMENTS

2008/0065672 A1 3/2008 Bamford et al.
2008/0313161 A1 12/2008 Ramsey et al.
2009/0089334 A1 4/2009 Mohamed et al.
2009/0187599 A1 7/2009 Bruso et al.
2009/0300013 A1 12/2009 Kodavalla et al.

OTHER PUBLICATIONS

Oracle8i Parallel Server Administration, Deployment, and Performance, Release 2 (8.1.6) Part No. A76970-01, 6 Database Design Techniques, pp. 1-15.
Designing your databases for concurrency, Performance Monitoring and Tuning Guide, pp. 324-325.
IBM What's New?, DB2 Version 9.1 for z/OS, Seventh Edition (Dec. 2010) 119 pages.
DB2 9 Application Design for Performance and Availability.
Logical Bottleneck: Sequential Key Generation, slides 17-22.
Sybase Ase on Linux: Getting Rid of Database Deadlocks, SearchEnterpriseLinx.com, 1 page.
SQL Server 6.5 Introduces Insert Row Locking, http://www.left-brain.com/DesktopModules/EngagePublish, pp. 1-117.
SQL Server 2005 Waiting and Blocking Issues, http://www.informit.com/articles, pp. 1-32.
Netymon, Why mulgara/xa2 matters, pp. 1-8.
Chinese Office Action dated Nov. 5, 2013, 5 pages.

* cited by examiner

US 8,832,036 B2

PERFORMANCE OF CONCURRENT DATA INSERTING

TECHNICAL FIELD

The present invention relates to the field of databases and, more particularly, to improving performance of concurrent data inserting.

DISCUSSION OF THE RELATED ART

The performance of concurrent data inserting is always a big challenge in the database industry. In situations in which multiple processes concurrently insert data into a single table, if an index with an ascending (or descending) inserted key value is defined on that table, then these concurrent processes generally will select a same index page while inserting key values into the index (generally the last leaf page of the index is selected if the order of key values is ascending). As such, these inserting processes will have conflicts with each other while contending for this leaf page, and these conflicts include competition of lock, competition of I/O on this leaf page, etc. In an environment that has multiple database systems, such competition exists between processes from different systems, thereby significantly degrading performance of a large amount of inserting processes. Such leaf page incurring competition is referred to as a "hot spot" in a concurrent inserting environment. The generation of a hot spot will result in a significant degradation of performance of concurrent data inserting.

BRIEF SUMMARY

In an example embodiment, a method for improving performance of concurrent data inserting comprises adding a prefix to each key value in an index, where the prefix has a default value, and allocating a corresponding prefix to each concurrent inserting process in response to an occurrence of a hot spot mode being detected, where each allocated prefix is different from the default value. When an inserting operation is performed in a hot spot mode, deciding whether the key value can be inserted with the default value of the prefix. When insertion can be performed, the key value is inserted with the default value of the prefix. When insertion cannot be performed, the key value is inserted with another prefix allocated by the inserting process.

In other example embodiments, a system for improving performance of concurrent data inserting and a computer program product for improving performance of concurrent data inserting provide features similar to those of the example method.

By adding a prefix C0 to each key value in an index and allocating a corresponding C0 value to each concurrent inserting processes when an occurrence of a hot spot mode is detected, operation of multiple concurrent inserting processes on a hot spot is allocated into different sub-trees, so that conflict among the multiple inserting processes are reduced, thus improving the performance of concurrent data inserting and issues in the art are solved.

DETAILED DESCRIPTION

Figure 1:
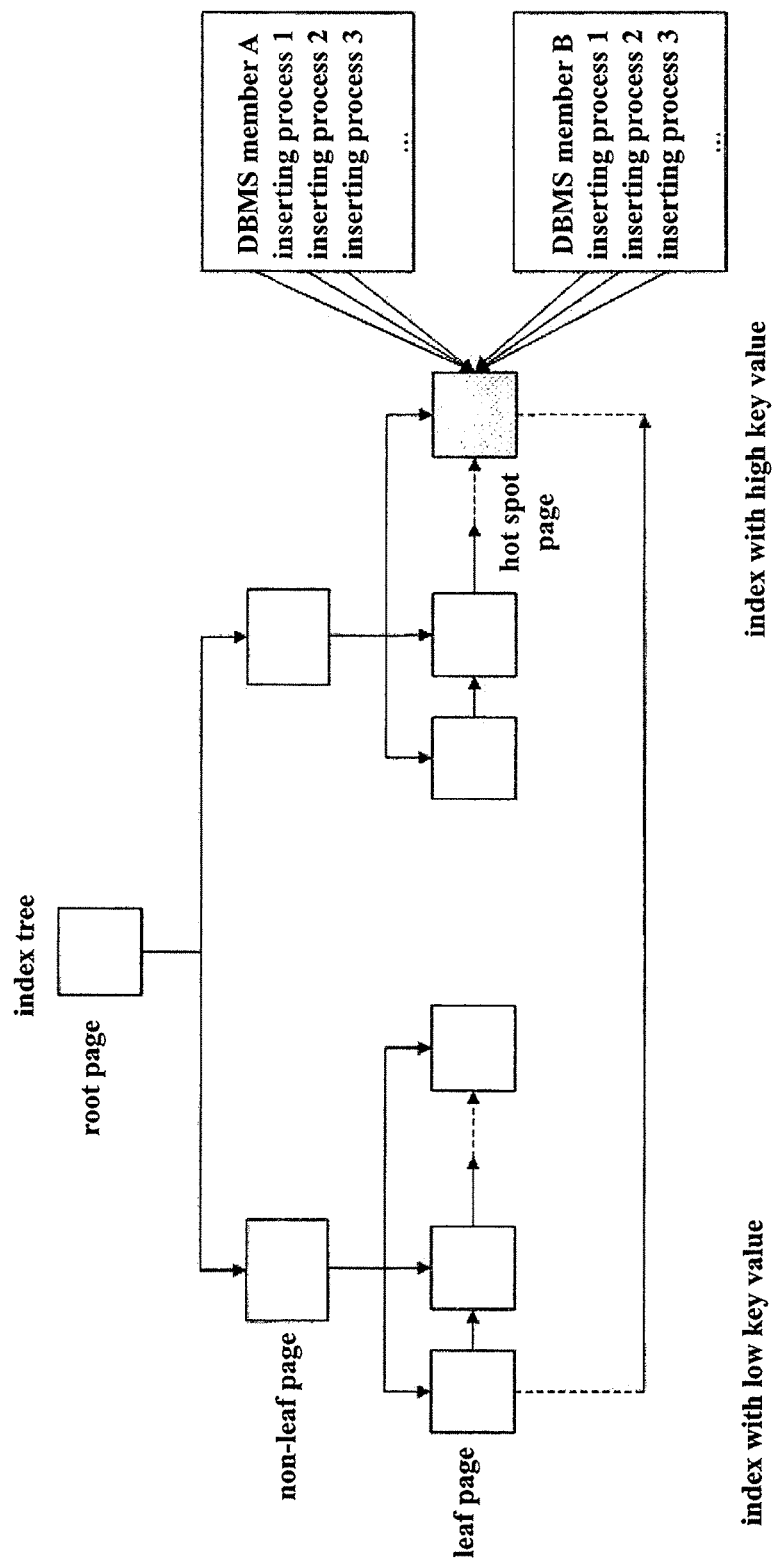
FIG. 1 is a diagram showing generation of a hot spot.

The disclosure may be better understood with reference to the description given below in conjunction with the drawings, in which the same or similar reference numbers are used to indicate the same or similar elements throughout the drawings.

For clarity and simplicity, not all features of actual embodiment are described in the description. However, it should be appreciated that many decisions specific to an actual embodiment must be made during development of any such actual embodiment so as to achieve specific objects of developers, for instance, to comply with those system and business related limiting conditions which may vary with different embodiments. Also, it should be appreciated that, although such development tasks may be complex and time-consuming, such developments are routine for those skilled in the art having the benefit of the disclosure of the example embodiments below.

In this regard, it should also be noted that only apparatus structures and/or process steps that are closely related to the disclosure are shown in the drawings and other details that are not closely related to the disclosure are omitted, so that they will not obscure the disclosure with unnecessary details.

The generation of a "hot spot" is described with reference to the diagram of FIG. 1.

FIG. 1 is a diagram showing the generation of a hot spot, taking an index key value inserted in ascending order as an example. As shown in FIG. 1, in accordance with a basic structure of an index, all the key values need to be stored in a lowest level leaf page in a small to large sequence. A new inserted key value must be placed into a correct leaf page to ensure sequentiality of the entire index. Assume that in two database system members A and B (as shown in FIG. 1), multiple inserting processes attempt to insert data into the index as shown in FIG. 1. Since key values of that index are in ascending order, each newly generated and to be inserted key value is larger than all the key values already existing in the entire index. Thus, all the inserting processes are attempting to insert a new key value into the last leaf page, such that the last leaf page becomes a "hot spot" for competition, such as shown by the last leaf page in FIG. 1.

Figure 2:
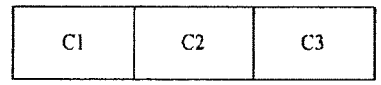
FIG. 2 is a first diagram showing an index key value and another diagram showing an index key value according to an example embodiment of the invention.
Figure 2:
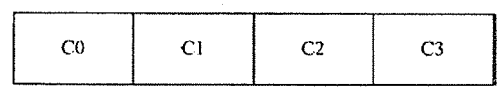

An example embodiment of the invention is now described with reference to FIG. 2. FIG. 2 shows a diagram 200A of a typical index key value and a diagram 200B of an index key value according to an example embodiment of the invention. As shown in FIG. 2, index key value 200A represents an index key value generated with data columns C1, C2 and C3 in data table. In accordance with an example embodiment of the invention, as shown for index key value 200B, a prefix C0 (also referred to as just C0) is added prior to each index key value 200A. C0 is only used by database management system (DBMS) to manage and provide access to the index and it is transparent to user. In other words, the user does not know the presence of C0. The length of C0 may be one byte, and its value may range from x'00 to x'FF. Of course, C0 may also have other lengths, such as 4 bits or 2 bytes. Its value range will vary with the length of C0.

C0 has a default value. In a normal mode without a hot spot, the value of C0 is maintained at a default value. For example, the default value of C0 may be x'00, and in the normal mode, the value of C0 is maintained at x'00. When a key value needs to be inserted into the index, the DBMS sets new inserted key values C0=x'00. Here, C0=x'00 is just an example of a default value of C0, and the default value of C0 may also be x'FF or any other value.

Those skilled in the art will understand that FIG. 2 is only an illustrative description. For example, index key value 200A may be generated with one or more data columns in a data table (such as only with C1), and the length of C0 and default value of C0 can both be prescribed arbitrarily.

A method 300 for improving performance of concurrent data inserting according to an example embodiment of the invention is now described with reference to FIG. 3. The method 300 starts at step 302. The method proceeds to step 304, in which a prefix C0 is added to each key value in an index, where C0 has a default value. As described above, C0 is only used by the DBMS to manage and provide access to the index and it is transparent to the user, that is, user does not know the presence of C0. For ease of description, the disclosure uses C0 having one byte as an example. However, it will be understood by those skilled in the art that C0 may also have other lengths, such as 4 bits or 2 bytes or other suitable lengths. Taking C0 having one byte as an example, a default value of C0 may be x'00, and in normal mode the value of C0 is maintained at x'00. Of course, C0=x'00 is only an example of default value of C0, and the default value of C0 may also be such value as x'FF or any other value. For ease of description, the default value of C0 is x'00 in subsequent part of this disclosure.

Next, the method proceeds to step 306, in which it is detected whether a hot spot mode occurs. When multiple processes attempt to write to a leaf page, the writing to the leaf page is serialized with a page lock. At a certain moment, only one process can hold the page lock and in turn write to the leaf page. All other processes have to wait in the queue so as to get the page lock. According to an example embodiment, if during a certain time period, a number of processes waiting for inserting operations reaches a predetermined threshold and an average waiting time of processes waiting for inserting operation reaches a predetermined threshold, then an occurrence of a hot spot mode is detected. The threshold for the number of processes and the threshold for the average waiting time can be set empirically or can be calculated according to a certain algorithm and/or historic data, or can be determined in any other manner known in the art.

Next, if it is detected that a hot spot mode has not occurred (or a hot spot mode has not been detected), the method proceeds to step 308 in which the index is accessed in the normal mode. In the normal mode, by adding C0 having default value (such as C0=x'00) prior to the original index key value, the DBMS utilizes a key value to which C0 is added to access the index.

In response to an occurrence of a hot spot mode being detected, the method proceeds to step 310 in which a corresponding C0 value is allocated to each concurrent inserting process, where each allocated C0 value is different from the default value. As such, each concurrent inserting process has its corresponding C0 value.

Next, the method proceeds to step 312, in which an inserting operation is performed in the hot spot mode.

Then, the method proceeds to step 314, in which it is judged whether the key value can be inserted with the default value of C0. If insertion can be performed, the method proceeds to step 316, in which the key value is inserted with the default value of C0. If insertion cannot be performed, the method proceeds to step 318, in which the key value is inserted with a C0 value allocated by the inserting process.

Next, the description is still based on the example scenario in which the length of C0 is one byte and C0=x'00 is the default value of C0. Assume that N concurrent inserting processes result in hot spot mode. When an occurrence of a hot spot mode is detected, a corresponding C0 value other than default value of C0 is allocated to each of the N inserting processes, for example, C0=x'01 is allocated to the first inserting process, C0=x'02 is allocated to the second inserting process, . . . , and so on. Here, preferably, C0s allocated by inserting processes that belong to different database management systems respectively are different from each other, and C0s allocated by inserting processes that belong to a same DBMS are also preferably different from each other. However, when a number of inserting processes that belong to a same DBMS exceeds the maximal value allowed by the C0 allocated for the inserting processes, C0 can be reused. For example, assume there are inserting processes from two DBMSs (DBMS1, DBMS2), in which the number of inserting processes from DBMS1 is 300 and the number of inserting processes from DBMS2 is 55. It is ensured that C0s allocated to inserting processes that belong to different DBMSs respectively are different from each other. For example, values from C0=x'01 to C0=x'7F are allocated to inserting processes that belong to DBMS1 (127 in total), values from C0=x'80 to C0=x'FF are allocated to inserting processes that belong to DBMS2 (128 in total). For inserting processes that belong to DBMS1, since a number of processes is greater than the maximal value allowed by C0 allocated for the processes, C0 can be reused, that is, multiple inserting processes that belong to DBMS1 may share a certain C0 value. Of course, the description is based on C0 having a length of one byte, but the case as described above can be solved by increasing the length of C0. When the inserting operation is performed in a hot spot mode, first, it is judged whether a key value can be inserted with a default value of C0. If it can be inserted, the key value is inserted with the default value of C0. If it cannot be inserted, the key value is inserted with a C0 value allocated by the inserting process. As such, after the inserting operation is performed in the hot spot mode, since values of C0 are different, the index is "divided" into multiple sub-trees, in which an index sub-tree corresponding to a C0 having the default value is a primary sub-tree, and an index sub-tree corresponding to a C0 having a value other than the default value is a secondary sub-tree. By allocating corresponding C0 values to different inserting processes, the operations on a hot spot page are allocated into different secondary sub-trees corresponding to allocated C0 values, such that conflicts among multiple inserting processes are reduced, performance of concurrent data inserting is improved, and problems that would otherwise occur are effectively solved.

Figure 3:
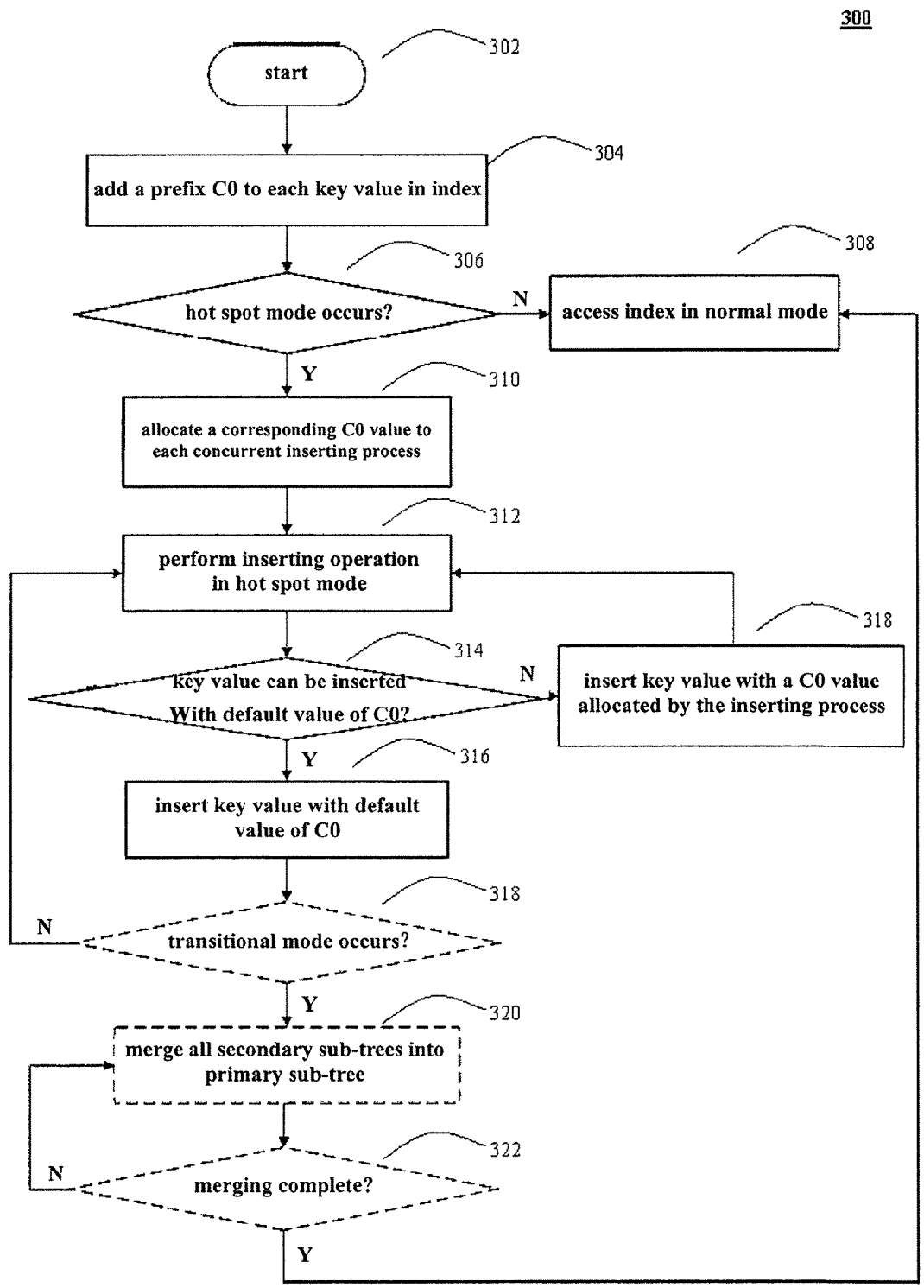
FIG. 3 is a flowchart showing a method for improving performance of concurrent data inserting according to an example embodiment of the invention.

Now referring to FIG. 3, the method further includes detecting whether a transitional mode occurs in step 318. If during a certain time period, a speed of inserting a key value in the secondary sub-tree is below a predetermined threshold, then an occurrence of a transitional mode is detected.

When an occurrence of a transitional mode is detected, the method proceeds to step 320, in which all secondary sub-trees are merged into a primary sub-tree in response to an occurrence of a transitional mode being detected. The merging of all secondary sub-trees into a primary sub-tree may be realized by using ONLINE INDEX REORG (online index reorganization), where all secondary sub-trees are scanned to obtain key values therein. Key values in secondary sub-trees are inserted into corresponding locations in a primary sub-tree, and all key values in secondary sub-trees are deleted. When it is determined that a merging of all secondary sub-trees into a primary sub-tree is completed in step 322, the method proceeds to step 308, in which an index is accessed in the normal mode.

Whether it is in normal mode, hot spot mode, or transitional mode, the accesses to an index (such as querying process) are all performed via a key value with prefix C0. The difference is, in the normal mode, the prefix C0 is a default value. In the hot spot mode and transitional mode, however, the prefix C0 is a correspondingly allocated C0 value.

In the normal mode, when a querying process accesses data with the index, the database system only needs to add an implicit condition "C0=default" in the condition of a sub-sentence WHERE. Since the C0s of all key values have default values at this moment, implicit condition "C0=default" actually does not have any filtering function, but it can ensure that the optimizer will choose "Index Matching" that has relatively high access efficiency to access the index.

In the hot spot mode and transitional mode, when a querying process accesses data with the index, the database system needs to further add an implicit condition "C0 IN (0, 1, 2, . . . , 255)" in the condition of sub-sentence WHERE. This can result in the optimizer choosing "Index Screening" to access the index. This means that all index sub-trees will be accessed once and one by one. Since most key values lie in a primary sub-tree corresponding to C0=default, the overhead of access to a secondary sub-tree will be relatively small and thus it will have limited influence on online querying.

Figure 4:
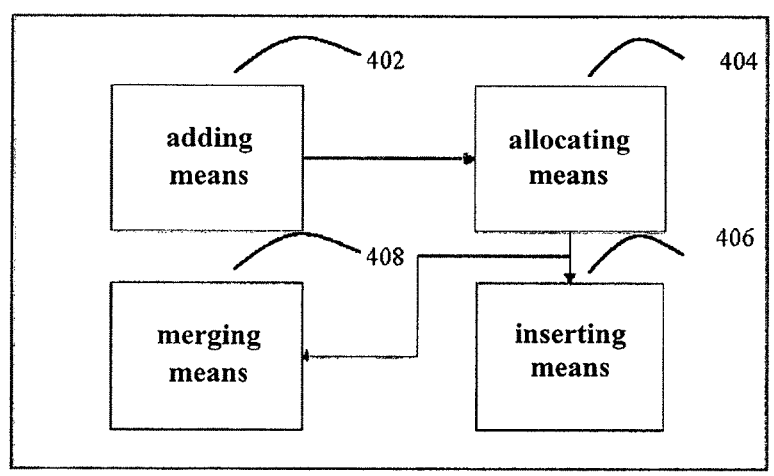
FIG. 4 shows a system for improving performance of concurrent data inserting according to an example embodiment of the invention.

FIG. 4 shows a system 400 for improving performance of concurrent data inserting according to an embodiment of the disclosure. The system 400 for improving performance of concurrent data inserting as shown in FIG. 4 includes an adding module or adding means 402 configured to add a prefix C0 to each key value in an index, where the C0 has a default value, an allocating module or allocating means 404 configured to allocate a corresponding C0 value to each concurrent inserting process in response to an occurrence of a hot spot mode being detected by the allocating means, where each allocated C0 value is different from the default value, and an inserting module or inserting means 406 configured to decide when an inserting operation is performed in the hot spot mode, and whether the key value can be inserted with the default value of C0. If insertion can be performed, the key value is inserted with the default value of C0. If insertion cannot be performed, the key value is inserted with a C0 value allocated by the inserting process. After the inserting operation is performed in the hot spot mode, since values of C0 are different, the index is "divided" into multiple sub-trees, in which an index sub-tree corresponding to a C0 having the default value is a primary sub-tree, and an index sub-tree corresponding to a C0 having other value than the default value is a secondary sub-tree.

The system 400 for improving performance of concurrent data inserting as shown in FIG. 4 further includes a merging module or merging means 408 configured to merge all the secondary sub-trees into the primary sub-tree in response to an occurrence of a transitional mode being detected. The merging means operates to merge all the secondary sub-trees into the primary sub-tree by scanning all the secondary sub-trees to obtain key values in the secondary sub-trees, inserting key values in the secondary sub-trees into corresponding locations in the primary sub-tree, and deleting all the key values in the secondary sub-trees.

The basic principle of the disclosure is described above in conjunction with specific embodiments. However, it should be noted that those skilled in the art can appreciate that all or any step or means of the method and apparatus of the disclosure may be implemented in by any computing means or structure (including a processor, a storage medium, etc.) or network of computer means in hardware, firmware, software, or a combination of thereof, and this can be achieved by those skilled in the art by using basic programming skills in view of the above description.

The above examples can also be implemented by running a program or a set of programs on any computer readable storage mediums. Thus, the example embodiments also be implemented by providing a computer program product which includes a computer readable storage medium including computer readable program code for implementing the methods described above. The storage medium may be any known storage medium or any storage medium that will be developed in future.

It should also be noted that, in the apparatus and method of the disclosure, obviously, each means or step can be combined in any suitable manner. Such combination or recombination can be viewed as an equivalent solution of the example embodiments described above. Further, steps for performing the above series of processes may be performed according the mentioned order naturally in time sequence, but not necessarily in time sequence. Some steps may be performed in parallel or independently with each other.

Although the disclosure and its benefits have been described in detail, it should be appreciated that various modifications, replacements and changes may be made without departing from the spirit and scope of the disclosure defined by appended claims. Further, terms "including", "containing" or any other variations in the application are intended to encompass non-exclusive inclusion, such that process, method, article or means containing a series of elements include not only those elements, but other elements not listed explicitly, or include elements inherent to such process, method, article or means. Without further limitation, element defined by phrase "including a . . . " does not exclude that the process, method, article or means that contain that element also contained therein other same element.

What is claimed:

1. A computer implemented method for improving performance of concurrent data inserting, including:
    adding a prefix to each key value in an index, wherein the prefix is initially set with a predefined default value;
    allocating a corresponding prefix to each concurrent inserting process in response to an occurrence of a hot spot mode being detected, wherein each allocated prefix is different from the default value;
    performing an inserting operation in the hot spot mode, wherein the inserting operation includes deciding whether a key value can be inserted with the default value of the prefix;
    in response to a determination that an insertion of a key value with the default value of the prefix can be performed, inserting the key value with the default value of the prefix; and
    in response to a determination that an insertion of a key value with the default value of the prefix cannot be performed, inserting the key value with another prefix allocated by the inserting process.

2. The method of claim 1, wherein performing the inserting operation in the hot spot mode results in an index comprising an index sub-tree corresponding to a prefix having the default value being a primary sub-tree, and an index sub-tree corresponding to a prefix having a different value than the default value being a secondary sub-tree.

3. The method of claim 1, wherein detection of a hot spot mode occurs when a number of processes waiting during a specified time period for an inserting operations reaches to a predetermined threshold, and an average waiting time of processes waiting for an inserting operation during the specified time period reaches a predetermined threshold.

4. The method of claim 2, further comprising:
detecting an occurrence of a transitional mode in response to a speed of inserting a key value in the secondary sub-tree being below a predetermined threshold during a specified time period.

5. The method of claim 4, further comprising:
merging all the secondary sub-trees into the primary sub-tree in response to an occurrence of the transitional mode being detected.

6. The method of claim 5, wherein merging all the secondary sub-trees into the primary sub-tree further includes:
scanning all the secondary sub-trees to obtain key values in the secondary sub-trees;
inserting key values in the secondary sub-trees into corresponding locations in the primary sub-tree; and
deleting all the key values in the secondary sub-trees.

7. The method of claim 6, wherein the merging of all the secondary sub-trees into the primary sub-tree is achieved using an online index reorganization function.

8. The method of claim 1, wherein prefixes allocated by inserting processes that belong to different database management systems are different from each other.

9. The method of claim 1, wherein an index is accessed with the key value having the prefix.

10. A system for improving performance of concurrent data inserting, the system comprising:
a processor;
an adding module utilized by the processor to add a prefix to each key value in an index, wherein the prefix is initially set to a predefined default value;
an allocating module utilized by the processor to allocate a corresponding prefix to each concurrent inserting process in response to an occurrence of a hot spot mode being detected by the allocating module, wherein each allocated prefix is different from the default value; and
an inserting module utilized by the processor to decide when an inserting operation is to be performed in the hot spot mode and whether the key value can be inserted with the default value of the prefix;
wherein, in response to a determination by the processor utilizing the inserting module that an insertion of a key value with the default value of the prefix can be performed, the key value is inserted by the processor utilizing the inserting module with the default value of the prefix, and, in response to a determination by the processor utilizing the inserting module that an insertion of a key value with the default value of the prefix cannot be performed, the key value is inserted by the processor utilizing the inserting module with another prefix allocated by the allocating module.

11. The system of claim 10, wherein the inserting operation performed by the processor utilizing the inserting module in the hot spot mode results in an index comprising an index sub-tree corresponding to a prefix having the default value being a primary sub-tree, and an index sub-tree corresponding to a prefix having a different value than the default value being a secondary sub-tree.

12. The system of claim 10, wherein detection of a hot spot mode by the processor utilizing the allocating module occurs when a number of processes waiting during a specified time period for an inserting operation reaches to a predetermined threshold, and an average waiting time of processes waiting for an inserting operation during the specified time period reaches a predetermined threshold.

13. The system of claim 11, further comprising a merging module utilized by the processor to detect an occurrence of a transitional mode in response to a speed of inserting a key value in the secondary sub-tree being below a predetermined threshold during a specified time period.

14. The system of claim 13, wherein the merging module is further utilized by the processor to merge all the secondary sub-trees into the primary sub-tree in response to an occurrence of the transitional mode being detected.

15. The system of claim 14, wherein the merging module is further utilized by the processor to merge of all the secondary sub-trees into the primary sub-tree by scanning all the secondary sub-trees to obtain key values in the secondary sub-trees, inserting key values in the secondary sub-trees into corresponding locations in the primary sub-tree, and deleting all the key values in the secondary sub-trees.

16. The system of claim 10, wherein an index is accessed with the key value having the prefix.

17. The system of claim 10, wherein the adding module is utilized by the processor to add a prefix to each key value in an index such that the index is accessed with the key value having the prefix.

18. A computer program product for improving performance of concurrent data inserting, the computer program product comprising:
a storage device comprising a computer readable storage medium having computer readable program code embodied therewith, the computer readable program code configured to:
add a prefix to each key value in an index, wherein the prefix is initially set to a predefined default value;
allocate a corresponding prefix to each concurrent inserting process in response to an occurrence of a hot spot mode being detected, wherein each allocated prefix is different from the default value;
perform an inserting operation in the hot spot mode, wherein the inserting operation includes deciding whether a key value can be inserted with the default value of the prefix;
in response to a determination that an insertion of a key value with the default value of the prefix can be performed, insert the key value with the default value of the prefix; and
in response to a determination that an insertion of a key value with the default value of the prefix cannot be performed, insert the key value with another prefix allocated by the inserting process.

19. The computer program product of claim 18, wherein performing the inserting operation in the hot spot mode by the computer readable program code results in an index comprising an index sub-tree corresponding to a prefix having the default value being a primary sub-tree, and an index sub-tree corresponding to a prefix having a different value than the default value being a secondary sub-tree.

20. The computer program product of claim 18, wherein detection of a hot spot mode by the computer readable program code occurs when a number of processes waiting during a specified time period for an inserting operations reaches to a predetermined threshold, and an average waiting time of processes waiting for an inserting operation during the specified time period reaches a predetermined threshold.

* * * * *